(12) United States Patent
Chen et al.

(10) Patent No.: US 6,549,594 B1
(45) Date of Patent: Apr. 15, 2003

(54) TIMING PHASE RECOVERY METHOD AND APPARATUS

(75) Inventors: Xixian Chen, Nepean (CA); Song Zhang, Nepean (CA); Shiquan Wu, Ottawa (CA)

(73) Assignee: Nortel Networks, St. Laurent (CA)

( * ) Notice: Subject to any disclaimer, the term of this patent is extended or adjusted under 35 U.S.C. 154(b) by 0 days.

(21) Appl. No.: 09/329,365

(22) Filed: Jun. 10, 1999

Related U.S. Application Data

(63) Continuation-in-part of application No. 09/321,818, filed on May 28, 1999.

(51) Int. Cl.[7] .............................................. H04L 7/00
(52) U.S. Cl. ................................................. 375/355
(58) Field of Search ............................... 375/343, 355, 375/371, 342, 373

(56) References Cited

U.S. PATENT DOCUMENTS

| | | | |
|---|---|---|---|
| 4,312,075 A | 1/1982 | Murano et al. ............. 375/106 |
| 5,121,325 A | 6/1992 | DeJonge ..................... 364/442 |
| 5,570,100 A | 10/1996 | Grube et al. ................ 342/457 |
| 5,581,578 A | 12/1996 | De Bot ....................... 375/261 |
| 5,619,524 A | * 4/1997 | Ling et al. .................. 375/130 |
| 5,726,742 A | 3/1998 | Nourrcier ................... 356/5.01 |
| 6,091,787 A | * 7/2000 | Westfall ...................... 375/340 |
| 6,121,927 A | * 9/2000 | Kalliojarvi .................. 342/453 |
| 6,366,629 B1 | * 4/2002 | Chen et al. ................... 348/21 |

* cited by examiner

*Primary Examiner*—Stephen Chin
*Assistant Examiner*—Kevin Kim

(57) ABSTRACT

A method for timing phase recovery including the steps of first, estimating an open-eye sequence of a received signal, second, estimating a channel response using the open-eye sequence, and third, correlating the estimated channel response with an ideal channel response to determine the peak correlation location. The peak correlation location corresponds to the recovered timing phase. A system including means for estimating an open-eye sequence of a received signal, a channel estimator and a correlator is also provided. The channel estimator is used for estimating a channel response using the open-eye sequence and the received signal. The correlator is used for correlating the estimated channel response with an ideal channel response to determine the peak correlation location, the peak correlation location corresponding to the recovered timing phase.

27 Claims, 8 Drawing Sheets

TIMING PHASE RECOVERY METHOD AND APPARATUS

RELATED APPLICATIONS

This is a continuation-in-part of application Ser. No. 09/321,818 filed on May 28, 1999.

FIELD OF THE INVENTION

The invention relates generally to timing phase recovery, and more particularly to timing phase recovery in digital communications systems.

BACKGROUND OF THE INVENTION

Generally, in a synchronous digital communication system, digital information is extracted from a received signal by demodulation and then sampling. In order to accurately sample the demodulated signal, usually some level of signal synchronization is required. Loosely speaking, synchronization is the function of determining some of the characteristics of the received signal. These characteristics are used to extract the digital information from the received signal. Synchronization is often referred to as symbol synchronization or timing recovery.

Timing recovery is an important function of a synchronous digital communication system. A receiver in the synchronous digital communication system must not only know the frequency of the received symbols, but also when to take samples within the symbol interval.

The choice of when to take samples within the symbol interval is known as the timing phase. Timing phase recovery is the task of estimating the timing phase of the received signal. Once the timing phase is estimated, the sampling time is adjusted to maximize the performance of the receiver. This performance maximization often includes adjusting the sampling instant to the maximum open-eye position of the demodulated signal. This corresponds to sampling the received signal in the centre of each symbol interval.

In known mobile digital communication systems, often the clock of the mobile unit is synchronized to a clock in the base station receiver. Therefore, in this implementation, the base station receiver only compensates for the propagation delay, carrier frequency offset and fading of the received signal when recovering the timing phase. Many known systems, however, are not robust under Doppler fading, carrier frequency offset and low C/I conditions.

Clearly, there is a need to robustly estimate the timing phase for a received signal in a digital communication system.

SUMMARY OF THE INVENTION

The invention is directed to a method and apparatus for robustly estimating the timing phase for a received signal in a digital communication system.

An aspect of the invention is a method for timing phase recovery including the following steps. First, estimating an open-eye sequence of a received signal. Second, estimating a channel response using the open-eye sequence and an adjusted signal. Third, correlating the estimated channel response with an ideal channel response to determine a peak correlation location. The peak correlation location corresponds to the recovered timing phase.

Another aspect of the invention is a system for timing phase recovery including means for estimating an open-eye sequence of a received signal, a channel estimator and a correlator. The channel estimator is used for estimating a channel response using the open-eye sequence and an adjusted signal. The correlator is used for correlating the estimated channel response with an ideal channel response to determine a peak correlation location, the peak correlation location corresponding to the recovered timing phase.

An advantage of the invention is robustness to Doppler fading, carrier frequency offset and low C/I.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

Figure 1:
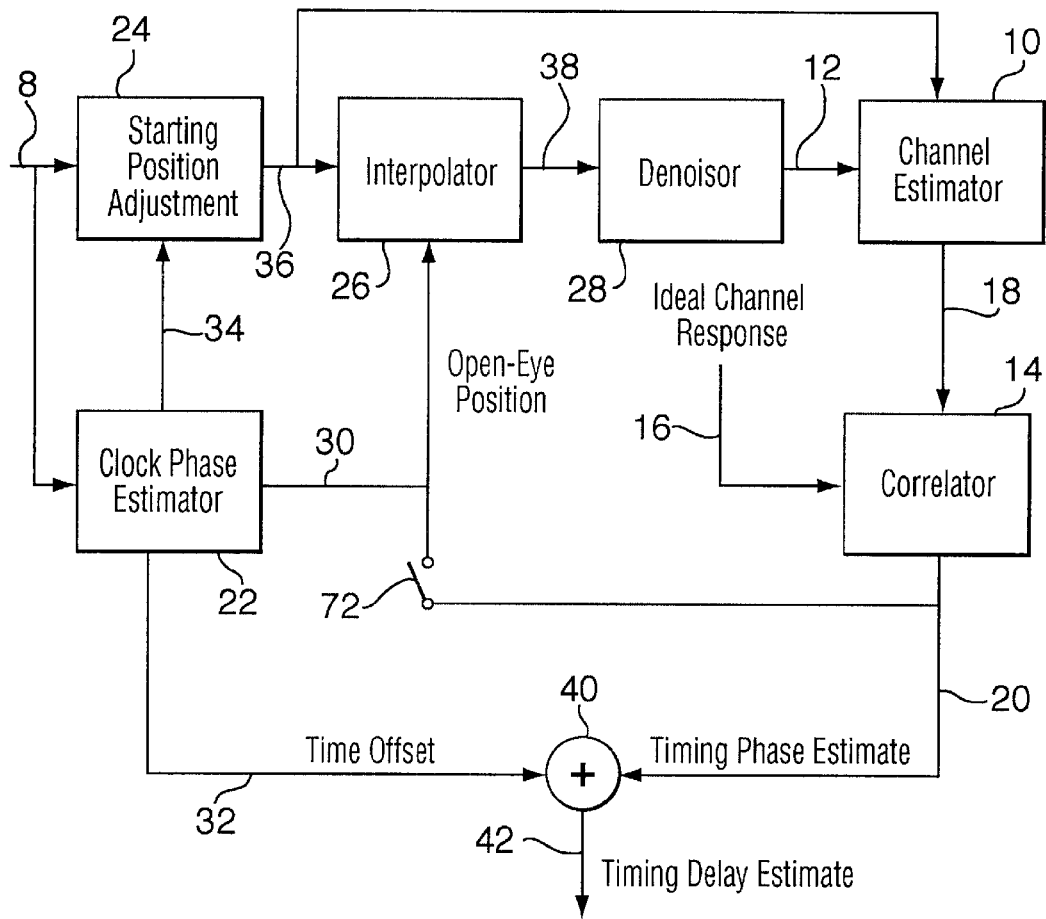
FIG. 1 is a block diagram of timing phase recovery system according to an embodiment of the invention.

First, a general overview of various embodiments of the invention is provided. Generally speaking, in a digital mobile communication system, the mobile clock is usually synchronized to the clock of the base station. In this case, the receiver of the base station is only required to estimate and compensate for the relative time delay between the transmitted and received signals. Various embodiments of the invention are for estimating the intra-symbol time delay. A clock phase estimator is first used to grossly recover the open-eye-sample sequence. The open-eye samples after denoising are then used to estimate the channel response based on the received signal. The estimated channel response is then correlated with the ideal local copy of the channel response. Its peak location gives the time delay estimate, which can be used as the recovered timing phase. The motivation for using the open-eye samples to estimate channel response is that they are derived from the original received signal. As a result, the open-eye samples suffer the same Doppler fading and phase rotating effects as the original received signal samples. They can be used to cancel the Doppler fading and phase rotating effects during the process of channel estimation. The various embodiments of the invention have been found to be robust to the Doppler fading, carrier frequency offset, and low C/I.

Thus, loosely speaking, embodiments of the invention for estimating the intra-symbol time delay are outlined as follows. The TDMA signal burst derived from a framer first goes through a clock phase estimator which has three outputs: the adjusted sampling phase (open-eye position), the starting position of the TDMA signal burst, and the time offset. After adjusting its starting position based on the result of the clock phase estimator, the TDMA signal burst is interpolated to get the open-eye samples, which are then denoised and used to estimate the channel response basing the adjusted TDMA signal burst. The estimated channel response is correlated with the pre-stored ideal channel response and the peak position gives the initial intra-symbol delay estimate, which is adjusted by adding the time offset to give the final intra-symbol delay estimate. The estimated time delay can be taken as the timing phase. Throughout this application, the term "open-eye position" means the signal sampling instance at which the signal to noise ratio of the received signal is maximized. The "open-eye samples" are obtained by sampling the input signal at the "open-eye position." The time interval between two successive open-eye samples defines one symbol period. The "open-eye sequence" is obtained by normalizing the "open-eye samples," and has the same meaning as the "open-eye sample sequence."

One embodiment of the invention uses the timing phase recovery to estimate intra-symbol delay and uses the intra-symbol delay as a time of arrival (TOA) estimate. One way to locate a wireless communications device, such as a mobile phone, is to do a time difference of arrival (TDOA) estimation and use triangulation to estimate the mobile's location. The TDOA estimate is preferably obtained by estimating the time of arrival (TOA) of the mobile's signal at each radio receiver and then subtracting one TOA from another to get an estimate of a TDOA. TOA estimates are basically the signal propagation times from the mobile to the involved base stations, which are synchronized in time. TDOA estimates are the differences in these signal propagation times between base stations.

Therefore, in general, both the received signal and a known transmitted reference signal are used to estimate a baseband channel response, which is correlated with an ideal channel response to determine a TOA estimate. For auto-correlation, the radio receiver is usually required to have the knowledge of what the mobile is transmitting, which, in reality may not necessarily be available. The invention, generally speaking, can blindly recover an open-eye sample sequence and perform auto-correlation iteratively to give a final TOA estimation without knowing the transmitted sequence from the mobile.

Therefore, in general, the signal from the mobile is received by a wide-band digital receiver with the synchronized A/D converter at each cell site. The received wide-band signal is then down-converted to the over sampled baseband signal by a digital filter, which is buffered in baseband board with inserted GPS time stamps. A framer uses a known synchronization word to locate the signal burst boundary. Once the framer acquires the signal burst, the initial whole slot of open-eye samples is estimated by using a clock phase estimator and an interpolator. The estimated open-eye sequence is first processed to reduce the noise effects and then fed into the channel estimator to estimate the equivalent baseband channel response based on the received signal samples. The estimated channel response is used to correlate with the pre-stored ideal baseband channel response to give an auto-correlation based TOA estimation. The estimated TOA, produced by the auto-correlator, is then fed back to the interpolator to start a new round of open-eye estimation and auto-correlation by using the same received samples. After several iterations, a converged TOA is output as the final intra-symbol delay estimation. The intra-symbol delay estimation combines with the framer's inter-symbol delay estimation to form the final TOA estimation.

This concludes the general overview of various embodiments of the invention. Secondly, a detailed description of the structure of various embodiments of the invention is provided.

FIG. 1 illustrates a block diagram of a timing phase recovery system according to an embodiment of the invention. The system includes a means for estimating an open-eye sequence of a received signal 8, a channel estimator 10 and a correlator 14. The channel estimator 10 is used for estimating a channel response 18 using the open-eye sequence 12 and an adjusted signal 36. The correlator 14 is used for correlating the estimated channel response 18 with an ideal channel response 16 to determine the peak correlation location. The peak correlation location corresponds to the recovered timing phase 20.

Preferably, the estimating means includes a clock phase estimator 22, a starting position adjuster 24, an interpolator 26 and a denoisor 28. The clock phase estimator 22 is responsive to the received signal 8 and is used for determining an open-eye position 30, a time offset 32 and a signal burst starting position 34. The starting position adjuster 24 is responsive to the signal burst starting position 34 and is used for adjusting the starting position of the received signal 8 to produce the adjusted signal 36. The interpolator 26 is responsive to the adjusted signal 36 and is used for determining open-eye samples 38. The denoisor 28 is used for denoising the open-eye samples 38 by normalizing the open-eye samples 38 to minimize the amplitude error. The denoisor 28 produces the open-eye sequence 12.

Preferably, the channel estimator 10 uses the adjusted signal 36 as well as the open-eye sequence 12 to estimate the channel response 18.

Preferably, the system includes a first summer 40 for adding the recovered timing phase 20 and the time offset 32 to produce an intra-symbol delay 42.

Figure 2:
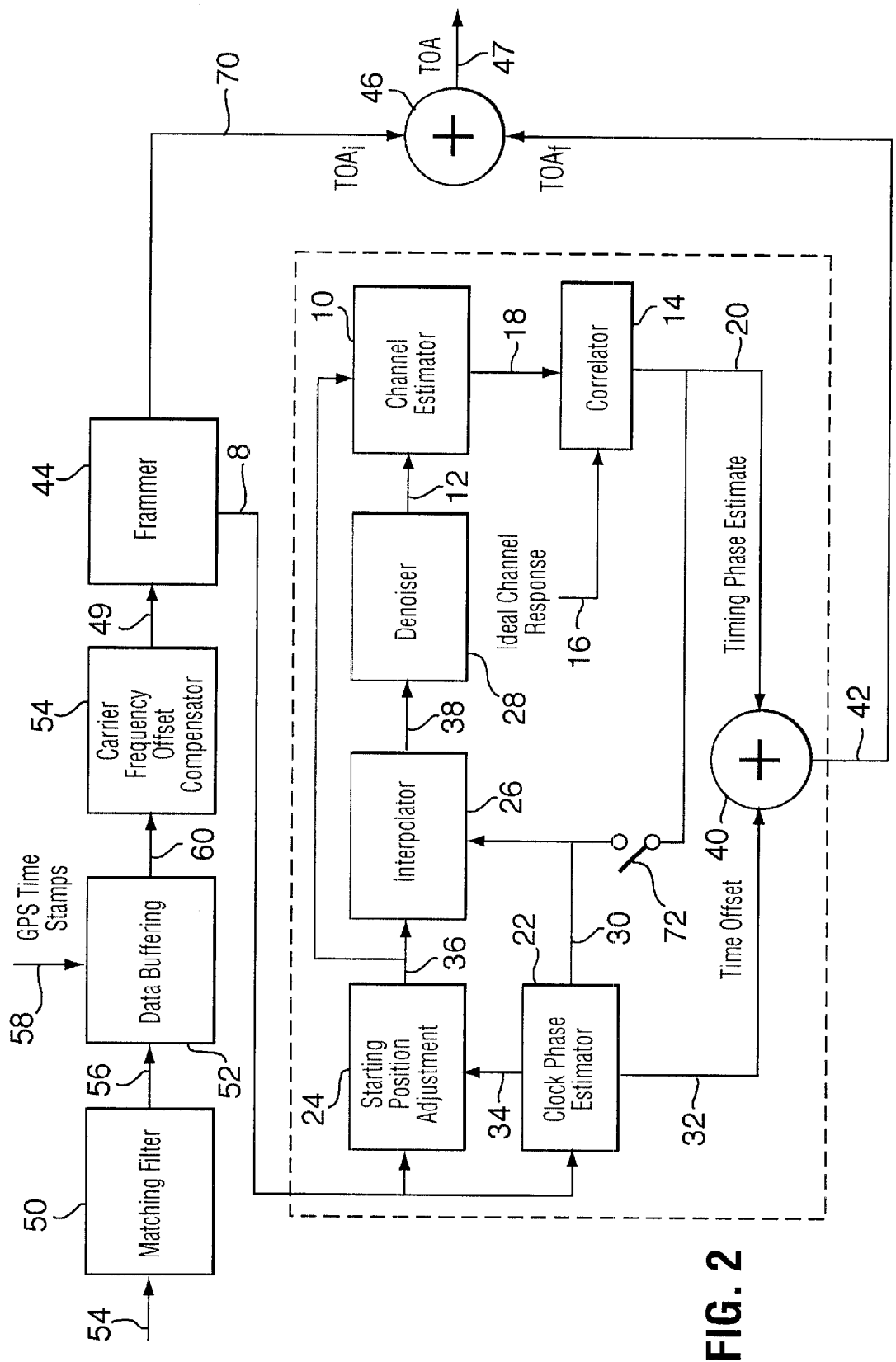
FIG. 2 is block diagram illustrating a time of arrival estimation part of a base station including a time of arrival estimator according to an embodiment of the invention.

FIG. 2 is block diagram illustrating the TOA estimation part of a base station including a time of arrival estimator according to an embodiment of the invention. Preferably, the elements of FIG. 1 are included as well as a framer 44 and a second summer 46 to produce a TOA estimate 47. The framer 44 captures the signal burst of received signal 8 and provides the inter-symbol delay 70 using the framer input signal 49. The second summer 46 combines the inter-symbol-delay 70 and the intra-symbol delay 42 to produce the TOA estimate 47.

Preferably, a matched filter 50, a data buffer 52 and a carrier frequency offset compensator 54 are also used. The matched filter 50 matched filters an input signal 54 to produce a filtered signal 56. The data buffer 52 buffers the filtered signal 56 and adds a global positioning system time stamp 58 to the filtered signal 56 to produce a buffered signal 60. The carrier frequency offset compensator 54 compensates for carrier frequency offset in the buffered signal 60 to produce the framer input signal 49. Taken together, the elements of FIG. 2 form the TOA estimation part of a base station.

In another embodiment of the invention comprising switch means 72 allows the recovered timing phase estimate to be used in estimating the open-eye sequence.

This concludes the detailed description of the structure of various embodiments of the invention. Thirdly, a detailed description of the operation of various embodiments of the invention is provided.

Figure 3:
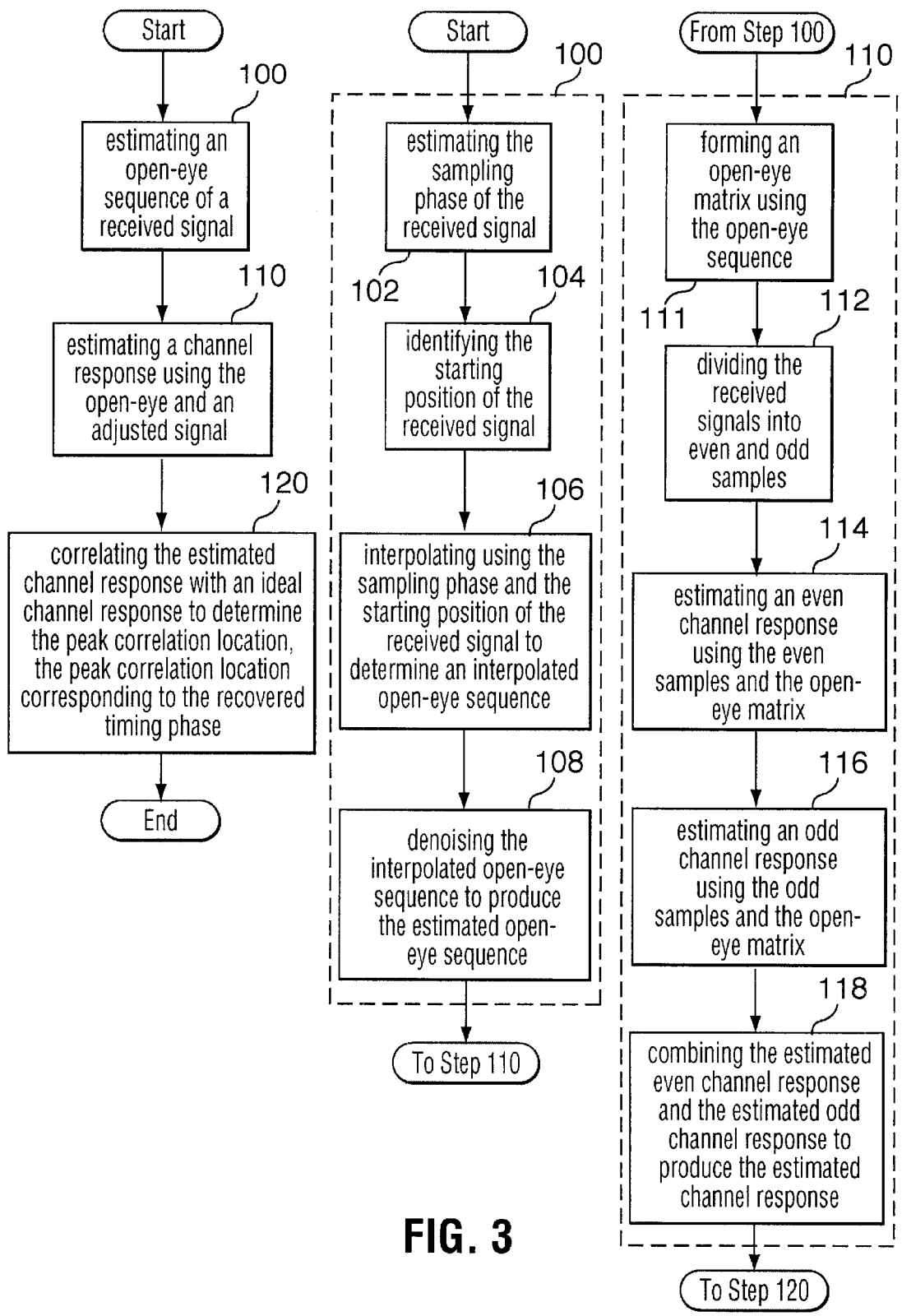
FIG. 3 is a flowchart illustrating a method for timing phase recovery according to an embodiment of the invention.

FIG. 3 is a flowchart illustrating a method for timing phase recovery according to an embodiment of the invention. The method for timing phase recovery comprises the steps of:

Estimating an open-eye sequence of a received signal (Step 100). Preferably this step includes the following steps:
    estimating the sampling phase of the received signal (Step 102);
    identifying the starting position of the received signal (Step 104);
    interpolating using the estimated sampling phase and the starting position of the received signal to determine an interpolated open-eye sequence (Step 106); and
    denoising the interpolated open-eye sequence to produce the estimated open-eye sequence with minimum interference (Step 108).

estimating a channel response using the open-eye sequence and the adjusted signal (Step 110). Preferably, this step includes the following steps:
    forming the open-eye matrix using a denoised open-eye sequence (Step 111) according to:

$$A = \begin{bmatrix} A(P) & A(P-1) & \ldots & A(1) \\ A(P+1) & A(P) & \ldots & A(2) \\ \ldots & \ldots & \ldots & \ldots \\ A(L) & A(L-1) & \ldots & A(L-P-1) \end{bmatrix}$$

where $\{A(1)A(2)\ldots A(L)\}$ is the denoised open-eye sequence.

dividing the adjusted signal into even and odd samples (Step 112).

estimating an even channel response using the even samples (Step 114) and the open-eye matrix. Preferably, the even channel response is estimated according to $G_E = A^+ X_E$, where $G_E$=The Estimated Even Channel Response Vector, $A^+ = (A^H A)^{-1} A^H$, the pseudoinverse of A, $X_E$=The Even Signal Vector.

estimating an odd channel response using the odd samples and the open-eye matrix (Step 116). Preferably, the odd channel response is estimated according to $G_O = A^+ X_O$, where $G_O$=The Estimated Odd Channel Response Vector, $A^+ = (A^H A)^{-1} A^H$, the pseudoinverse of A, $X_O$=The Odd Signal Vector.

combining the estimated even channel response and the estimated odd channel response to produce the estimated channel response (Step 118);

correlating the estimated channel response with an ideal channel response to determine the peak correlation location, the peak correlation location corresponding to the recovered timing phase (Step 120). Preferably, the ideal channel response is a raised cosine function.

Figure 4:
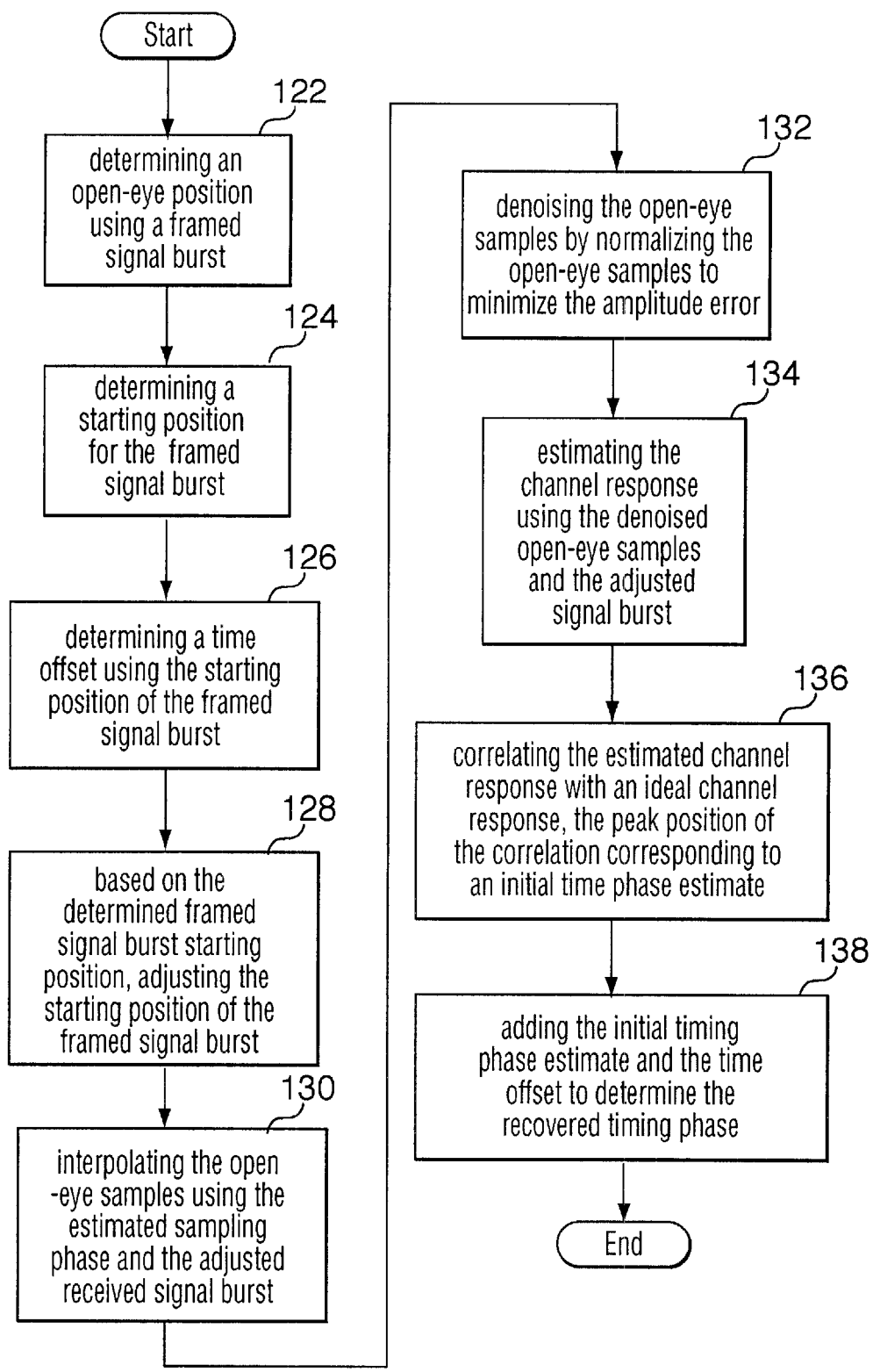
FIG. 4 is a flowchart illustrating a method for timing phase recovery according to another embodiment of the invention.

FIG. 4 is a flowchart illustrating a method for timing phase recovery according to another embodiment of the invention. The method includes the steps of:

determining an open-eye position using a framed signal burst (Step 122). Preferably, this step includes (not shown) estimating the sampling phases of the framed signal burst and determining the open-eye position using the symbol period and the estimated sampling phase. Also preferably, the sampling phase estimation step includes the following steps (not shown):
    multiplying the real and imaginary parts of the framed signal burst with a quadrature baud rate clock ($e^{jn\pi/2}$), respectively;
    low pass filtering the multiplication results, respectively, from step (a) to remove pattern jitters;
    complex squaring and summing the filtered results from step (b); and
    producing the sampling phase according to the formula:

$$\tau_1 = 0.5 + \frac{\text{arctg}(Im(Z), Re(Z))}{2\pi}$$

where $\tau_1$ is the sampling phase, $Re(Z)$ is the real part of the result from step (c), $Im(Z)$ is the imaginary part from the result of step (c) and arc tg(X, Y) is a four quadrant arc tangent of the real elements X and Y.

determining a starting position for the framed signal burst (Step 124). Preferably, this process includes the following steps (not shown):
    calculating the sampling phase referenced to the second sample of the framed signal burst according to the formula:

$$\tau_2 = \begin{cases} \tau_1 + 0.5 & \text{if } \tau_1 \leq 0.5 \\ \tau_1 - 0.5 & \text{if } \tau_1 > 0.5 \end{cases}$$

calculating $t_1 = \min(\tau_1, 1-\tau_1)$ and $t_2 = \min(\tau_2, 1-\tau_2)$, if $t_1 < t_2$, x(1) is chosen as the starting position for the framed signal burst, otherwise, x(2) is chosen as the starting position for the framed signal burst, where $\{x(1)\ x(2)\ \ldots\ x(N)\}$ is the framed signal burst.

determining a time offset from the start position of the framed signal burst (Step 126). If x(1) is chosen as the starting position, the time offset is set to zero, otherwise, the time offset is set to T/2, where T is the symbol period.

based on the determined framed signal burst starting, adjusting the starting position of the framed signal burst (Step 128).

interpolating the open-eye samples using the estimated sampling phase and the adjusted signal burst (Step 130). Preferably, the interpolating step uses a three-tap quadratic interpolator.

denoising the open-eye samples by normalizing the open-eye samples to minimize the amplitude error (Step 132). Preferably, this step includes normalizing the amplitude of the open-eye samples to one only if the amplitude of the open-eye samples is greater than a predetermined threshold (not shown).

estimating a channel response using the open-eye sequence and the adjusted signal (Step 134). Preferably, this step includes the following steps (not shown):
    forming the open-eye matrix using a denoised open-eye sequence according to:

$$A = \begin{bmatrix} A(P) & A(P-1) & \ldots & A(1) \\ A(P+1) & A(P) & \ldots & A(2) \\ \ldots & \ldots & \ldots & \ldots \\ A(L) & A(L-1) & \ldots & A(L-P-1) \end{bmatrix}$$

where $\{A(1) A(2) \ldots A(L)\}$ is the denoised open-eye sequence.

dividing the adjusted signal into even and odd samples.

estimating an even channel response using the even samples of the adjusted signal burst and the open-eye matrix. Preferably, the even channel response is estimated according to $G_E = A^+ X_E$, where $G_E$=The Estimated Even Channel Response Vector, $A^+ = (A^H A)^{-1} A^H$, the pseudoinverse of A, $X_E$=The Even Signal Vector.

estimating an odd channel response using the odd samples of the adjusted signal burst and the open-eye matrix. Preferably, the odd channel response is estimated according to $G_O = A^+ X_O$, where $G_O$=The Estimated Odd Channel Response Vector, $A^+ = (A^H A)^{-1} A^H$, the pseudoinverse of A, $X_O$=The Odd Signal Vector.

combining the estimated even channel response and the estimated odd channel response to produce the estimated channel response.

correlating the estimated channel response with an ideal channel response, the peak position of the correlation corresponding to an initial time phase estimate (Step 136).

adding the initial timing phase estimate and the time offset to determine the recovered timing phase. (Step 138).

Figure 5:
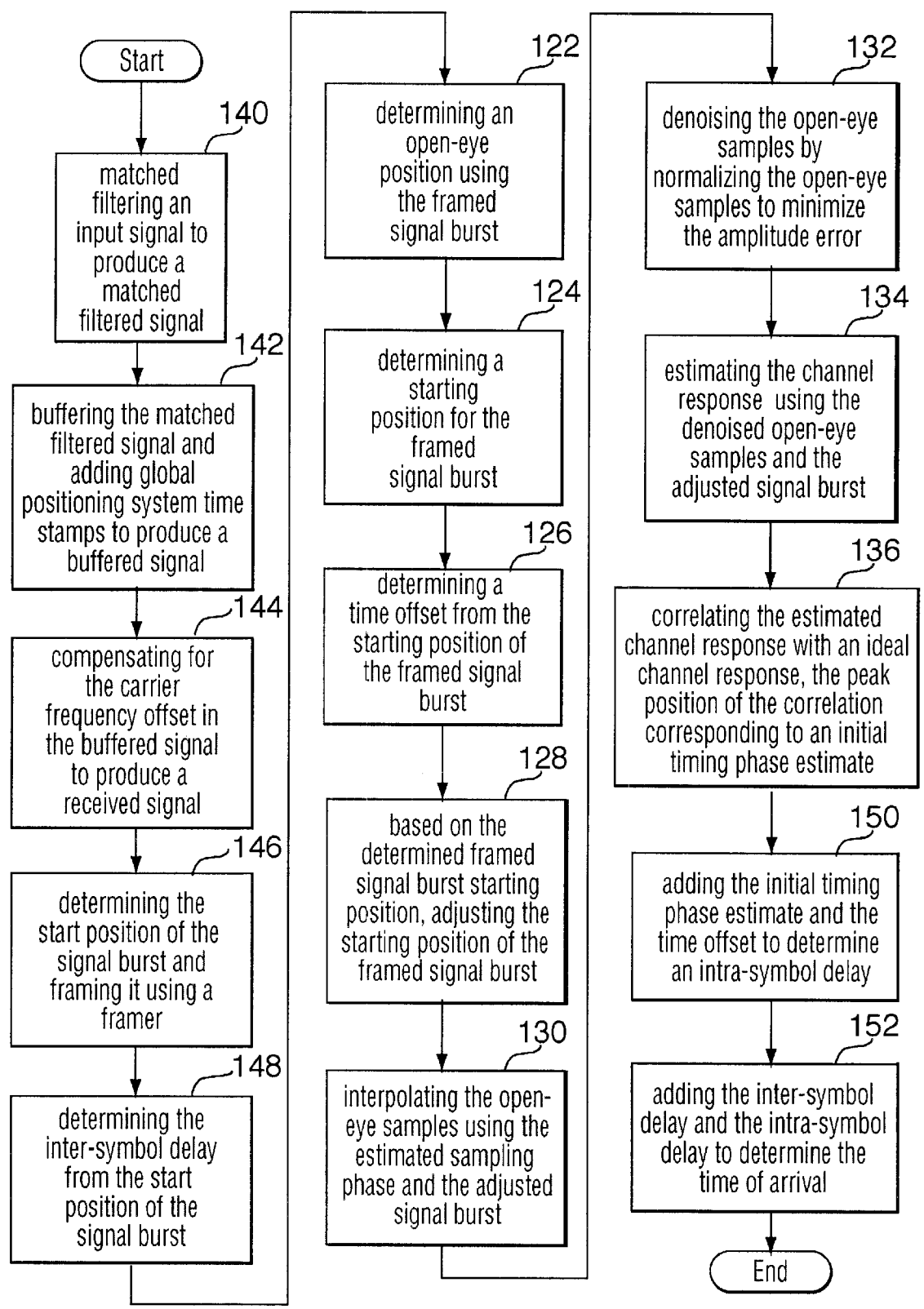
FIG. 5 is a flowchart illustrating a method for estimating a time of arrival according to another embodiment of the invention.

FIG. 5 is a flowchart illustrating a method for estimating a time of arrival according to another embodiment of the invention. The method includes the following steps:

matched filtering an input signal to produce a matched filtered signal (Step 140);

buffering the matched filtered signal and adding global positioning system time stamps to produce a buffered signal (Step 142);

compensating for the carrier offset in the buffered signal to produce a received signal (Step 144);

determining the start position of the signal burst and framing the signal burst using a framer (Step 146);

determining the inter-symbol delay from the start position of the signal burst (Step 148);

determining an open-eye position using the framed signal burst (Step 122). Preferably, this step includes (not shown) estimating the sampling phase of the framed signal burst and determining the open-eye position using the symbol period and the estimated sampling phase. Also preferably, the sampling phase estimation step includes the following steps (not shown):

multiplying the real and imaginary parts of the framed signal burst with a quadrature baud rate clock ($e^{j\pi t/2}$), respectively;

low pass filtering the multiplication results, respectively, from step (a) to remove pattern jitters;

complex squaring and summing the filtered results from step (b);

producing the sampling phase according to the formula:

$$\tau_1 = 0.5 + \frac{\text{arctg}(Im(Z), Re(Z))}{2\pi}$$

where $\tau_1$ is the sampling phase, Re(Z) is the real part of the result from step (c), Im(Z) is the imaginary part from the result of step (c) and arc tg(X, Y) is a four quadrant arc tangent of the real elements X and Y.

determining a starting position for the framed signal burst (Step 124). Preferably, this process includes the following steps (not shown):

calculating the sampling phase referenced to the second sample of the framed signal burst according to the formula:

$$\tau_2 = \begin{cases} \tau_1 + 0.5 & \text{if } \tau_1 \leq 0.5 \\ \tau_1 - 0.5 & \text{if } \tau_1 > 0.5 \end{cases}$$

calculating $t_1 = \min(\tau_1, 1-\tau_1)$ and $t_2 = \min(\tau_2, 1-\tau_2)$, if $t_1 < t_2$, x(1) is chosen as the starting position for the framed signal burst, otherwise, x(2) is chosen as the starting position for the framed signal burst, where $\{x(1) x(2) \ldots x(N)\}$ is the framed signal burst.

determining a time offset from the start position of the framed signal burst (Step 126), if x(1) is chosen as the starting position, the time offset is set to zero, otherwise, the time offset is set to T/2, where T is the symbol period.

based on the determined framed signal burst starting, adjusting the starting position of the framed signal burst (Step 128);

interpolating the open-eye samples using the estimated sampling phase and the adjusted signal burst (Step 130). Preferably, the interpolating step uses a three-tap quadratic interpolator.

denoising the open-eye samples by normalizing the open-eye samples to minimize the amplitude error (Step 132). Preferably, this step includes normalizing the amplitudes of the open-eye samples to one only if the amplitude of the open-eye samples is greater than a predetermined threshold (not shown).

estimating a channel response using the open-eye sequence and the adjusted signal (Step 134). Preferably, this step includes the following steps(not shown):

forming the open-eye matrix using the open-eye sequence. The open-eye sequence is used determining the denoised open-eye samples according to:

$$A = \begin{bmatrix} A(P) & A(P-1) & \ldots & A(1) \\ A(P+1) & A(P) & \ldots & A(2) \\ \ldots & \ldots & \ldots & \ldots \\ A(L) & A(L-1) & \ldots & A(L-P-1) \end{bmatrix}$$

where $\{A(1) A(2) \ldots A(L)\}$ is the denoised open-eye sequence.

dividing the adjusted signal burst into even and odd samples.

estimating an even channel response using the even samples of the adjusted signal burst and the open-eye matrix. Preferably, the even channel response is estimated according to $G_E = A^+ X_E$, where $G_E$=The Estimated Even Channel Response Vector, $A^+ =$ $(A^H A)^{-1} A^H$, the pseudoinverse of A, $X_E$=The Even Signal Vector.

estimating an odd channel response using the odd samples of the adjusted signal burst and the open-eye matrix. Preferably, the odd channel response is estimated according to $G_O = A^+ X_O$, where $G_O$=The Estimated Odd Channel Response Vector, $A^+ = (A^H A)^{-1} A^H$, the pseudoinverse of A, $X_O$=The Odd Signal Vector.

combining the estimated even channel response and the estimated odd channel response to produce the estimated channel response.

correlating the estimated channel response with an ideal channel response, the peak position of the correlation corresponding to an initial time phase estimate (Step 136);

adding the initial timing phase estimate and the time offset to determine an intra-symbol delay (Step 150); and adding the inter-symbol delay and the intra-symbol delay to determine the time of arrival (Step 152).

Figure 6:
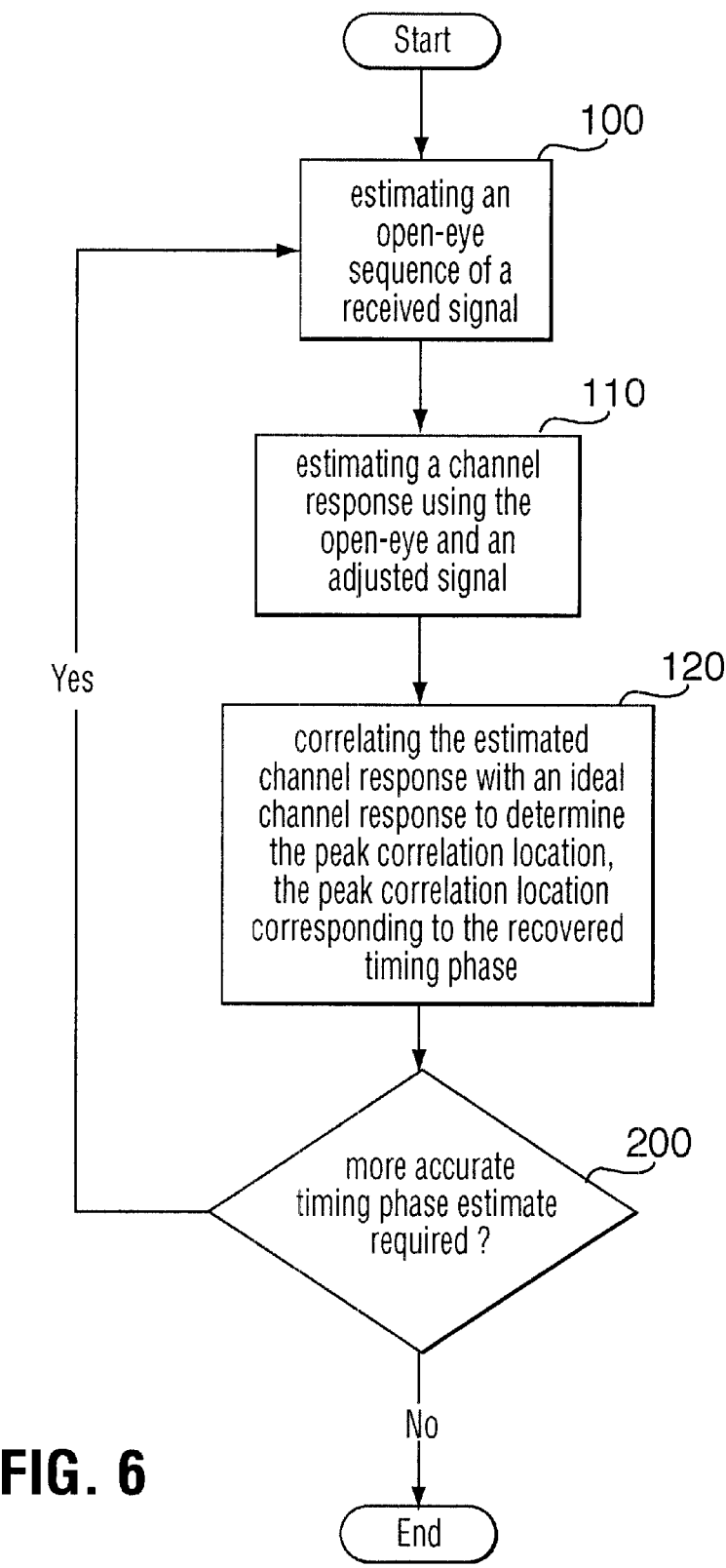
FIG. 6 is a flowchart illustrating a method for timing phase recovery according to an embodiment of the invention including an iterative approach.
Figure 7:
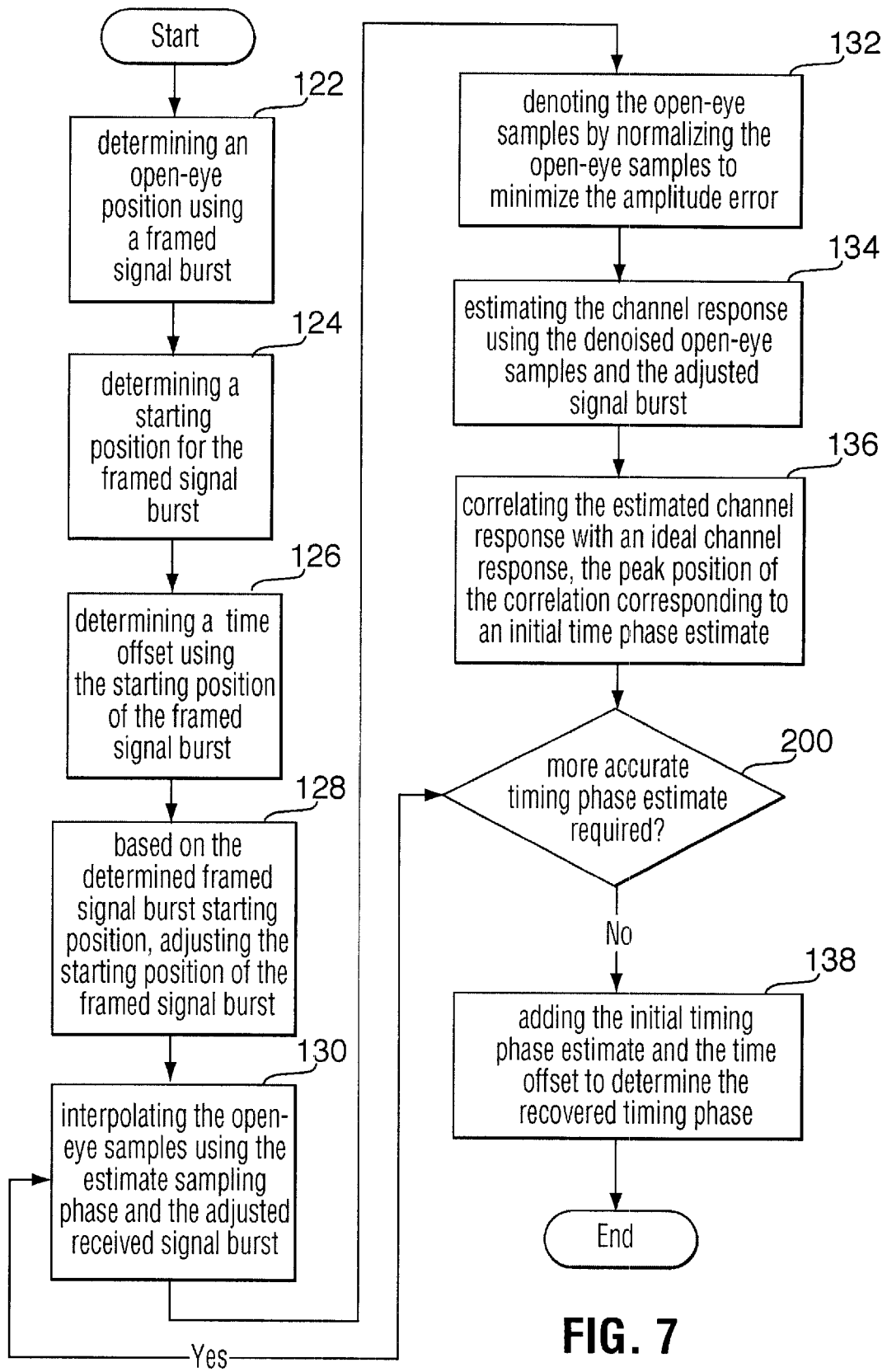
FIG. 7 is a flowchart illustrating a method for timing phase recovery according to another embodiment of the invention including an iterative approach.
Figure 8:
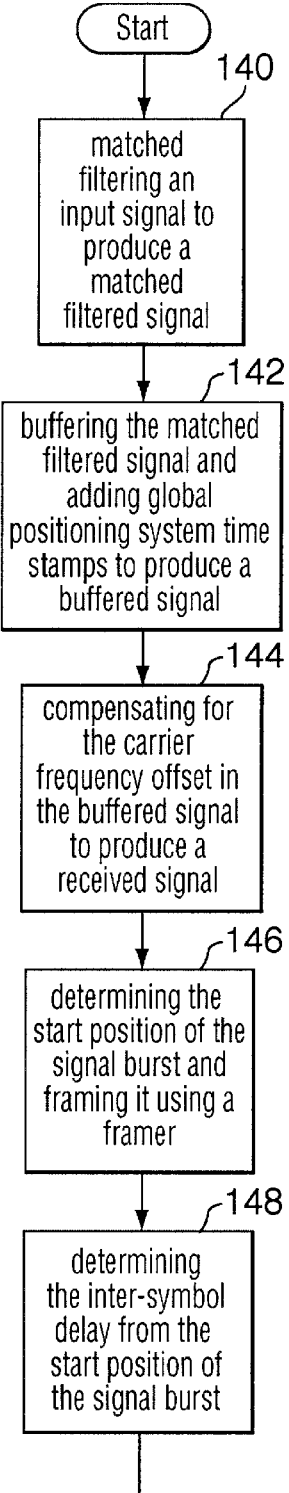
FIG. 8 is a flowchart illustrating a method for estimating a time of arrival according to another embodiment of the invention including an iterative approach.
Figure 8:
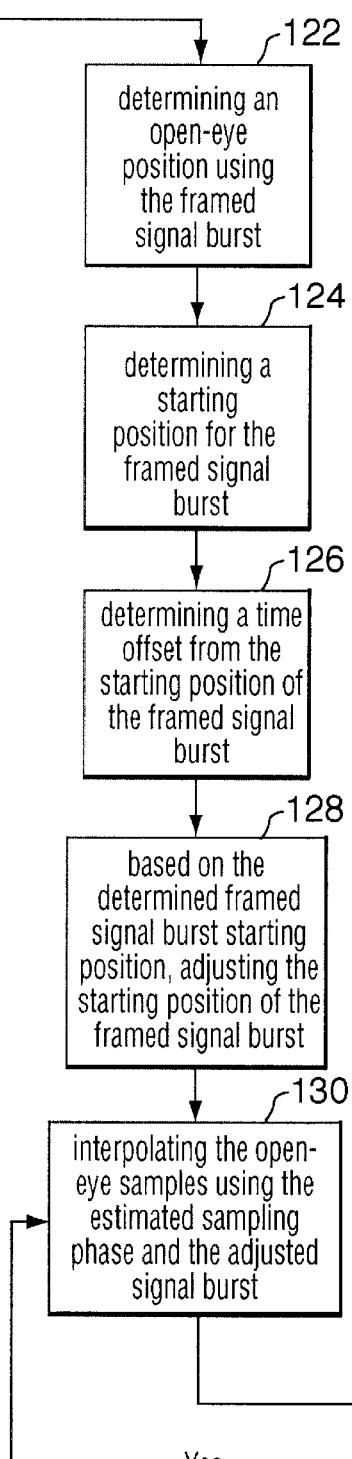
Figure 8:
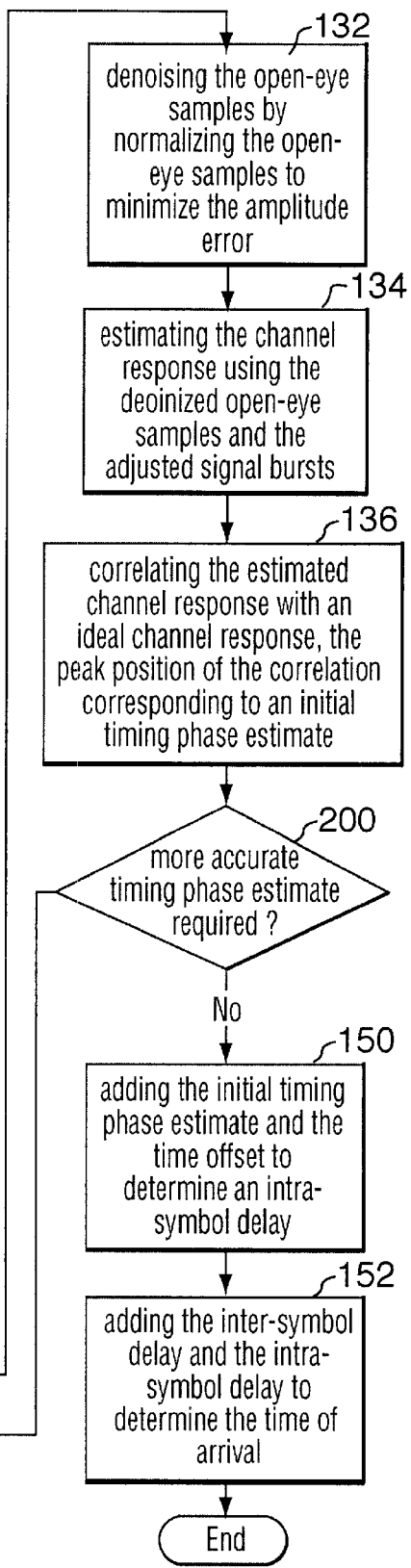

FIGS. 6, 7 and 8 describe other embodiments of the invention that employ an iterative approach. The estimated timing phase may be used in conjunction with more iterations of the method, each successive iteration provide an improved timing phase estimate. The number of iterations is predetermined, and is preferably two to three.

In FIG. 6, steps 100, 110 and 120 are repeated with step 100 using the recovered timing phase as well as the received signal to estimate the open-eye sequence for the second and successive iterations.

In FIG. 7 and FIG. 8 steps 130, 132, 134 and 136 are repeated with step 130 using the initial timing phase as well as the estimated sampling phase and the adjusted received signal burst to interpolate for the second and successive iterations.

This concludes the detailed description of the operation of various embodiments of the invention. Fourthly, a detailed description of the advantages of various embodiments of the invention is provided.

In general, an advantage of invention is robustness to Doppler fading, carrier frequency offset and low C/I.

The embodiment of the present invention directed to the estimation of the time of arrival (TOA) has the following advantages. Traditionally, auto-correlation needs the mobile transmission sequence as a reference to correlate with the received signal to estimate TOA. When the mobile transmission sequence is unknown, recovery of the transmitted sequence from the received signal is required to carry out auto-correlation. Usually, it can be done by recovering the information bits first and then modulating the bits into the data sequence just as what the transmitter does. But, due to low SNR, co-channel interference and fading, recovered information bits usually have errors, which will make the modulated sequence different from the mobile transmission sequence. Bit errors will propagate into subsequent modulated symbols, especially for DQPSK modulation, as defined in TDMA IS136. For this reason, in mobile communication environments, the traditional data recovery scheme is not a robust solution. The embodiments of the present invention, instead of recovering information bits and modulating them again, treats received DQPSK signalling as 8PSK and integrates an open-eye sample recovery scheme with auto-correlation on a baseband equivalent channel. Open-eye recovery and auto-correlation form a recurrent system and each iteration gives a better estimation. By doing this, bit errors and DQPSK error propagation will have no impact and the embodiments of the invention are robust to fading, carrier frequency offset and low C/I.

In general, correlation based TOA/TDOA algorithms usually fall into two categories, depending on what signal is used as a reference. When the data sequence transmitted from a mobile is used as the reference, auto-correlation gives TOA estimation, done at each radio receiver. When one received signal is used as the reference, cross-correlation directly gives TDOA estimation, which has to be done in a central processor where both received signals from two difference radio receivers can be available. From a system design perspective, since cross-correlation requires a high-speed link between each radio and the central processor, an auto-correlation based system architecture is always preferred. But, on the other hand, auto-correlation requires each radio have the knowledge of the mobile's transmitted data signal. When the mobile's transmitted data signal is not available at each radio, it is very desirable to have a data signal recovery system integrated with the auto-correlation processor. The various embodiments of the present invention solve this problem without much degradation on the performance.

Location determination based on TOA estimation techniques may also offer the following advantages in addition to E911:

child tracking criminal tracking roadside assistance vehicle fleet management, for example, rental and truck companies direction finding traffic information location based billing or advertisements While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method for timing phase recovery comprising the steps of:

a. estimating an open-eye sequence of a received signal;

b. estimating a channel response using the open-eye sequence and an adjusted signal; and c. correlating the estimated channel response with an ideal channel response to determine a peak correlation location, the peak correlation location corresponding to the recovered timing phase.

2. The method recited in claim 1 further comprising the step of repeating steps (a), (b) and (c), step (a) using the recovered timing phase as well as the received signal to estimate the open-eye sequence for the second and successive iterations, to determine an improved timing phase estimate, the number of iterations being predetermined.

3. The method recited in claim 1 wherein step (a) comprises the steps of:

a. estimating the sampling phase of the received signal;

b. identifying a starting position of the received signal;

c. interpolating using the sampling phase and the starting position of the received signal to determine an interpolated open-eye sequence; and d. denoising the interpolated open-eye sequence to produce the estimated open-eye sequence with minimum interference.

4. The method recited in claim 1 wherein step (b) comprises the steps of:
   a. forming an open-eye matrix using the open-eye sequence;
   b. dividing the received signals into even and odd samples;
   c. estimating an even channel response using the even samples and the open-eye matrix;
   d. estimating an odd channel response using the odd samples and the open-eye matrix;
   e. combining the estimated even channel response and the estimated odd channel response to produce the estimated channel response.

5. The method recited in claim 1 wherein the ideal channel response in step (c) is a raised cosine function.

6. A method for timing phase recovery comprising the steps of:
   a. determining an open-eye position using a framed signal burst;
   b. determining a starting position for the framed signal burst;
   c. determining a time offset using the starting position of the framed signal burst;
   d. based on the determined staring position of the framed signal burst, adjusting the starting position of the framed signal burst;
   e. interpolating open-eye samples using an estimated sampling phase and the adjusted starting position of the framed signal burst;
   f. denoising the open-eye samples by normalizing the open-eye samples to minimize the amplitude error;
   g. estimating a channel response using the denoised open-eye samples and the framed signal burst with the adjusted starting position;
   h. correlating the estimated channel response with an ideal channel response to determine a peak position of the correlation, the peak position of the correlation corresponding to an initial time phase estimate; and
   i. adding the initial timing phase estimate and the time offset to determine the recovered timing phase.

7. The method recited in claim 6 further comprising the step of repeating steps (e)–(h), step (e) using the initial timing phase as well as the estimated sampling phase and the adjusted starting position of the framed signal burst to interpolate for the second and successive iterations, to determine an improved initial timing phase estimate, the number of iterations being predetermined.

8. The method recited in claim 6, wherein step (a) comprises the steps of:
   a. estimating a sampling phase of the framed signal burst; and
   b. determining the open-eye position using the symbol period and the estimated sampling phase.

9. The method recited in claim 8 wherein step (a) comprises the steps of:
   a. multiplying the real and imaginary parts of the framed signal burst with a quadrature baud rate clock;
   b. low pass filtering the multiplication results, respectively, from step (a) to remove pattern jitter;
   c. complex squaring and summing the filtered result from step (b); and d. producing the sampling phase according to the formula:

$$\tau_1 = 0.5 + \frac{\text{arctg}(Im(Z), Re(Z))}{2\pi}$$

where $\tau_1$ is the sampling phase, $Re(Z)$ is the real part of the result from step (c), $Im(Z)$ is the imaginary part from the result of step (c) and arc tg(X,Y) is a four quadrant arc tangent of the real elements X and Y.

10. The method recited in claim 6 wherein step (e) comprises the step of:
    a. interpolating using a three-tap quadratic interpolator.

11. The method recited in claim 6 wherein step (f) comprises the step of:
    a. normalizing the amplitudes of the open-eye samples to one only if the amplitude of the open-eye samples is greater than a predetermined threshold.

12. The method in claim 6 wherein step (g) comprises the steps of:
    f. forming an open-eye matrix using the open-eye sequence;
    g. dividing the received signals into even and odd samples;
    h. estimating an even channel response using the even samples and the open-eye matrix;
    i. estimating an odd channel response using the odd samples and the open-eye matrix;
    j. combining the estimated even channel response and the estimated odd channel response to produce the estimated channel response.

13. The method recited in claim 6
    a. wherein step (a) comprises the steps of:
        i. multiplying the real and imaginary parts of the framed signal burst with a quadrature baud rate clock;
        ii. low pass filtering the multiplication results from step (i) to remove pattern jitter;
        iii. complex squaring and summing the filtered result from step (ii); and
        iv. estimating a sampling phase according to the formula:

$$\tau_1 = 0.5 + \frac{\text{arctg}(Im(Z), Re(Z))}{2\pi}$$

where $\tau_1$ is the sampling phase, $Re(Z)$ is the real part of the result from step (iii), $Im(Z)$ is the imaginary part from the result of step (iii) and arc tg(X,Y) is a four quadrant arc tangent of the real elements X and Y;
        v. determining the open-eye position using a symbol period and the estimated sampling phase;
    b. wherein step (f) comprises the step of:
        i. normalizing the amplitudes of the open-eye samples to one only if the amplitude of the open-eye samples is greater than a predetermined threshold.

14. The method recited in claim 13 wherein the channel response estimation step comprises the steps of:
    a. forming an open-eye matrix using the open-eye sequence;
    b. dividing the received signals into even and odd samples;
    c. estimating an even channel response using the even samples and the open-eye matrix;

d. estimating an odd channel response using the odd samples and the open-eye matrix;

e. combining the estimated even channel response and the estimated odd channel response to produce the estimated channel response.

15. The method recited in claim 14 wherein the interpolating step uses a three-tap quadratic interpolation.

16. A method for estimating a time of arrival comprising the steps of:

a. matched filtering an input signal to produce a matched filtered signal;

b. buffering the matched filtered signal and adding global positioning system time stamps to produce a buffered signal;

c. compensating for the carrier frequency offset in the buffered signal to produce a received signal;

d. determining a start position of a signal burst and framing the signal burst using a framer;

e. determining an inter-symbol delay from the start position of the signal burst;

f. determining an open-eye position using the framed signal burst;

g. determining a starting position for the framed signal burst;

h. determining a time offset from the starting position of the framed signal burst;

i. based on the determined starting position of the framed signal burst, adjusting the starting position of the framed signal burst;

j. interpolating open-eye samples using an estimated sampling phase and the determined starting position of the framed signal burst;

k. denoising the open-eye samples by normalizing the open-eye samples to minimize the amplitude error;

l. estimating a channel response using the denoised open-eye samples and the framed signal burst with the adjusted starting position;

m. correlating the estimated channel response with an ideal channel response to determine a peak position of the correlation, the peak position of the correlation corresponding to an initial timing phase estimate; and n. adding the initial timing phase estimate and the time offset to determine an intra-symbol delay;

o. adding the inter-symbol delay and the intra-symbol delay to determine the time of arrival.

17. The method recited in claim 16 further comprising the step of repeating steps (j)–(m), step (j) using the initial timing phase as well as the estimated sampling phase and the adjusted received signal burst to interpolate for the second and successive iterations, to determine an improved initial timing phase estimate, the number of iterations being predetermined.

18. The method recited in claim 16 c. wherein step (f) comprises the steps of:

i. multiplying the real and imaginary parts of the framed signal burst with a quadrature baud rate clock;

ii. low pass filtering the multiplication results from step (i) to remove pattern jitter;

v. complex squaring and summing the filtered result from step (ii); and vi. estimating a sampling phase according to the formula:

$$\tau_1 = 0.5 + \frac{\text{arctg}(Im(Z), Re(Z))}{2\pi}$$

where $\tau_1$ is the sampling phase, Re(Z) is the real part of the result from step (iii), Im(Z) is the imaginary part from the result of step (iii) and arc tg(X,Y) is a four quadrant arc tangent of the real elements X and Y;

v. determining the open-eye position using a symbol period and the estimated sampling phase;

d. wherein step (k) comprises the step of:

j. normalizing the amplitudes of the open-eye samples to one only if the amplitude of the open-eye samples is greater than a predetermined threshold.

19. The method in claim 18 wherein the channel response estimation step comprises the steps of:

a. forming an open-eye matrix using the open-eye sequence;

b. dividing the received signals into even and odd samples;

c. estimating an even channel response using the even samples and the open-eye matrix;

d. estimating an odd channel response using the odd samples and the open-eye matrix;

e. combining the estimated even channel response and the estimated odd channel response to produce the estimated channel response.

20. The method recited in claim 16 wherein the interpolating step (j) uses a three-tap quadratic interpolation.

21. A system for timing phase recovery comprising:

a. means for estimating an open-eye sequence of a received signal;

b. a channel estimator for estimating a channel response using the open-eye sequence and an adjusted signal; and c. a correlator for correlating the estimated channel response with an ideal channel response to determine a peak correlation location, the peak correlation location corresponding to the recovered timing phase.

22. The system recited in claim 21 further comprising switch means for allowing the recovered timing phase estimate to be used in estimating the open-eye sequence.

23. The system recited in claim 21 wherein the estimating means comprises:

a. a clock phase estimator responsive to the received signal for determining an open-eye position using a framed signal, a time offset and a signal burst starting position;

b. a starting position adjuster responsive to the signal burst starting position for adjusting the starting position of the received signal to produce an adjusted signal;

c. an interpolator responsive to the adjusted signal for determining open-eye samples; and d. a denoisor for denoising the open-eye samples by normalizing the open-eye samples to minimize the amplitude error.

24. The system as recited in claim 23 wherein the channel estimator uses the adjusted signal as well as the open-eye sequence to estimate the channel response.

25. The system recited in claim 24 further comprising a first summer for adding the recovered timing phase and the time offset to produce an intra-symbol delay.

26. The system recited in claim 25 further comprising:
   a. a framer for estimating an inter-symbol delay using a framer input signal; and
   b. a second summer for combining the inter-symbol-delay and the intra-symbol delay to produce a time of arrival estimate.

27. The system recited in claim 26, the system further comprising:
   a. a matched filter for matched filtering an input signal to produce a filtered signal;
   b. a data buffer for buffering the filtered signal and for adding a global positioning system time stamp to the filtered signal to produce a buffered signal; and
   c. a carrier frequency offset compensator for compensating for carrier offset in the buffered signal to produce the framer input signal.

* * * * *